(12) United States Patent
Herkenrath et al.

(10) Patent No.: US 6,512,312 B1
(45) Date of Patent: Jan. 28, 2003

(54) METHOD AND A DEVICE FOR DETECTING THE PRESENCE OF PERSONNEL IN UNDERGROUND MINING

(75) Inventors: Peter Herkenrath, Bottrop (DE); Bernhard Richter, Hünstetten (DE)

(73) Assignee: DBT Automation GmbH (DE)

( * ) Notice: Subject to any disclaimer, the term of this patent is extended or adjusted under 35 U.S.C. 154(b) by 0 days.

(21) Appl. No.: 09/612,827

(22) Filed: Jul. 7, 2000

(30) Foreign Application Priority Data

Jul. 9, 1999 (DE) .......................................... 199 31 852
Jun. 17, 2000 (DE) .......................................... 100 29 918

(51) Int. Cl.$^7$ ................................................ E21F 17/00
(52) U.S. Cl. ............................................................. 307/326
(58) Field of Search .................................. 307/326–328

(56) References Cited

U.S. PATENT DOCUMENTS 4,495,496 A * 1/1985 Miller, III ............... 340/825.54
4,722,574 A * 2/1988 Barham et al. ................. 299/1

\* cited by examiner

*Primary Examiner*—Fritz Fleming
(74) *Attorney, Agent, or Firm*—Cook, Alex, McFarron, Manzo, Cummings & Mehler, Ltd.

(57) ABSTRACT

A method and a device for use in underground mining for the detection of the presence of persons at mine faces supported by support frames, whereby detection sensors (25) are provided on at least some of the support frames (10), and which are coupled to control units (27) for the support frames (10), whereby the detection sensors (25) sample the working and operating area (24) of the associated support frame (10) and bring the latter to a standstill in its movement sequence, if the detection sensors (25) detect the presence of a person in a detection area (30). In accordance with the invention the detection sensors (25) of the individual support frames (10) can be switched on and off by the control units (27) and are only activated when the associated support frame (10) is to be moved and are again de-activated after completion of the movement of the associated support frame (10). The monitoring of the face is therefore only effected in the area endangered by the movement of a support frame (10), so that any electro-smog owing to the electromagnetic waves emitted from the detection sensors and possibly having damaging effects on the miners is reduced.

36 Claims, 4 Drawing Sheets

FIG.4
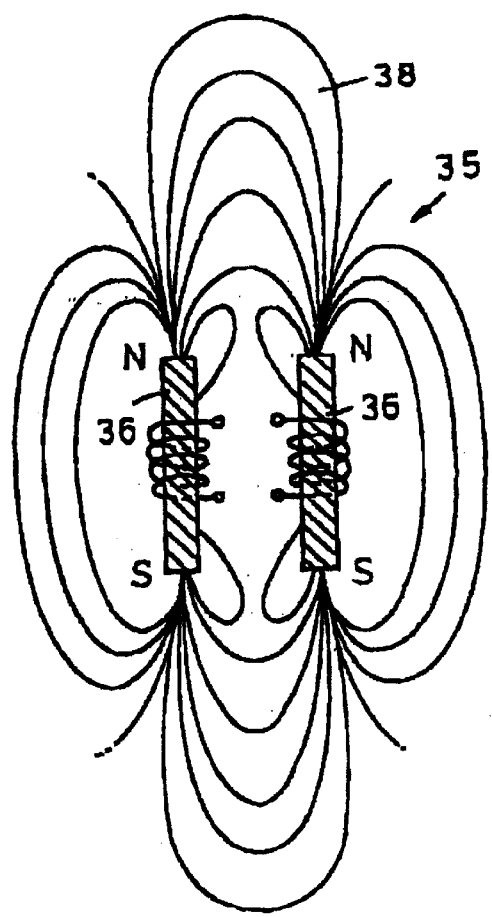
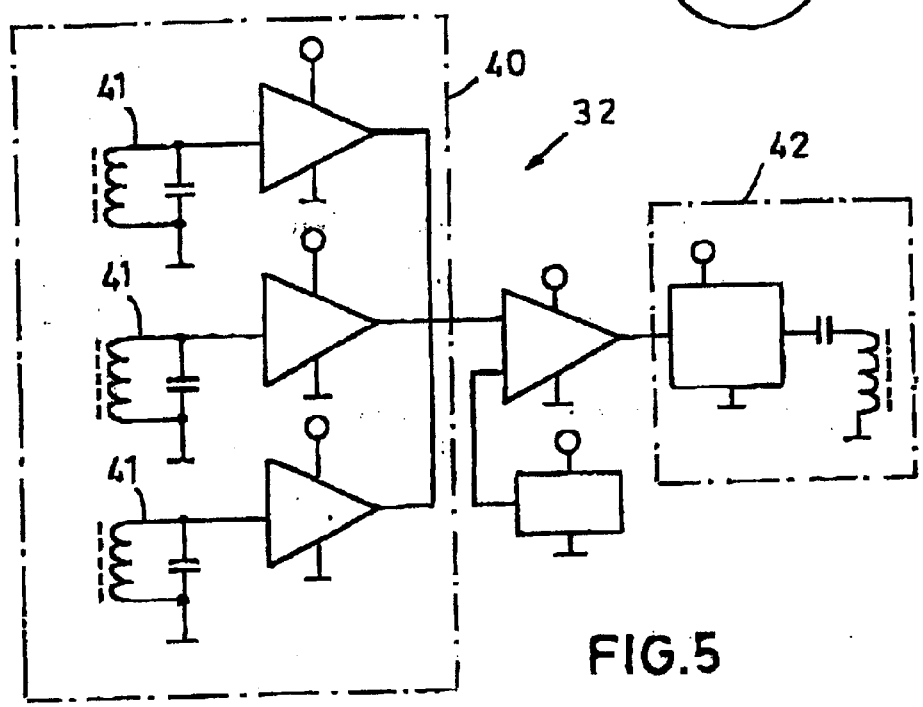
FIG.5

METHOD AND A DEVICE FOR DETECTING THE PRESENCE OF PERSONNEL IN UNDERGROUND MINING

The present invention relates to a method for use in underground mining for detecting the presence of persons in mining faces supported by support frames in which detection sensors are provided on at least some of the support frames, and which are coupled to control units for the support frames, whereby the detection sensors sample at least the working and operating area of a support frame to which they are assigned and bring that frame to a standstill or do not permit its movement, if the presence of a person is established in a detection area. The present invention further relates to a device for use in underground mining for the detection of the presence of persons in mining faces supported by support frames, whereby detection sensors are provided on at least some of the support frames, and are coupled to control units for the support frames, and which sample at least the working and operating areas of the associated support frames.

In modern mining of coal or other minerals by underground mining, extraction is commonly effected using a coal-extraction machine operating back and forth between two headings, for instance a shearing machine or an extraction plough. The roof of the face is underpinned and supported by a multiplicity of support frames arranged alongside each other, which are normally all attached to a conveyor for the removal of the coal or materials extracted onto it, to which the extraction machine also leads. Following the passage of the extraction machine the conveyor and the support frames are moved forward in the direction of the mining face, to which end following the pushing forward of the conveyor, the individual support frames are retracted (withdrawn) a little, then, with the aid of an advancing cylinder, are drawn forward (advanced) in the direction of the conveyor, and then the roof caps of the support frames are extended, until the prescribed support pressure is reached and the roof is again safely underpinned (setting). This method of operation of such an advancing support frame is well known.

In modern mining, each support frame is commonly provided with its own electrical or electro-hydraulic control unit, can be connected together for the exchange of information with each other, by means of which also dependent movement sequences can be performed by several support frames arranged alongside each other. The various movements of a support frame can be initiated automatically from a supervising control monitor and independently performed; it is also possible, however, to move a selected support frame manually via the keyboard of a control unit, whereby in this case the manual operation is not carried out from the control unit arranged on the support frame to be moved, but from the control unit on an adjacent support frame, which is connected by a control line to the control unit of the support frame to be moved (Isleworth safe distance support advance control).

A movement of a support frame, i.e. the retraction of the roof cap (withdrawal), advancing in the direction towards the face conveyor and re-extension of the roof cap (setting), should only occur when there is no person in the working and operating area of the individual support frame, so as to avoid accidents involving personal injury. The working and operational area of a support frame is to be understood to be that area bounded by the roof cap, the ground shoes, the rear gob shield and the face conveyor arranged in front of it, that is, that section of a face which is supported by the support frame. In order to avoid a movement of the support frame, whilst persons are to be found in this area, monitoring devices and procedures are installed, which only permit withdrawal, advancing and setting of the frame if no persons are put in danger thereby.

A method and a device of the construction described in the opening paragraph of the present specification are proposed in DE-OS 36 27 174, in which detection sensors are arranged on the support frames such that each sensor transmits a continuous signal in order to monitor an individual detection area. The method requires that each individual person at the face carries a transponder, which is a small transmitting and receiving device, which works with the detection sensors on the individual support frames, and is located by a sensor if the person is within the detection area of that individual sensor. As soon as a sensor receives a signal from the transponder, it passes a control signal to the control unit of the support frame, following which the control unit puts the normal control function of the support frame out of action and prevents movement of the support frame as long as the person is within the working and operational area of the support frame.

This device and this method have the disadvantage that all the detection sensors at the face are permanently active, which results in a relatively heavy current usage, which must be covered by expensive and intrinsically safe power circuits. Owing to the permanent activation of all the sensors at the face, the transponders carried by the individual persons are also permanently active and have a large energy requirement, which must be covered by transportable energy supplies such as batteries or accumulators and which, with a minimum operating duration of ten hours are relatively large and heavy. Furthermore, the detection sensors transmit permanent electromagnetic signals, which lead to a non-negligible electro-smog at the face, which can affect the health of the persons working at the face, and possibly influences their concentration, which can endanger the safety of the miners. Furthermore, false switching can easily occur owing to the permanent activation of all the -sensors and the electromagnetic waves transmitted by them, if the electromagnetic signal transmitted by one sensor is distorted, possibly after multiple reflections or similar, and is misinterpreted as the signal of a transponder by another detection sensor, and can lead to the immobilisation of a support frame in whose working and operating area there is no miner and which therefore could be moved without danger.

It is an aim of the present invention to address one or more of these disadvantages, and to produce a method and a device of the construction described at the beginning of the present specification, in which electro-smog at the face owing to the detection sensors is avoided and by which the current requirement not only of the detection sensors, but also of the transponders carried by the supervising personnel is small.

Accordingly the present invention is a method according to the opening paragraph of the present specification in which the detection sensors can be activated by the control units of the support frame and are activated before a planned movement of the support frame and de-activated after the completion of the movement.

Advantageously each support frame is provided with at least one detection sensor. It is alternatively possible to provide detection sensors only on alternate support frames and having the detection area of the sensors is large enough such that the working and operating areas of two adjacent support frames can be monitored together.

Preferably the detection sensor of a support frame to be moved is activated at a time before the planned support frame movement, and then the working and operating area of at least the support frame concerned is sampled, and a stop signal is transmitted to the control unit if the presence of a person is established during the sampling, or a release signal is transmitted if no person is established in the detection area during the sampling. Thus detection sensors at the face are thus only activated by the control units of the support frame to which the sensors are allocated when a movement of the support frame is shortly to occur. Normally a movement of the support frame is announced by a warning signal some five seconds before the start of the movement sequence. At about the same time the detection sensors assigned to the support frame to be moved are activated, which, after their activation, sample the working and operating area of the support frame concerned to establish whether a person is in the area. The sensor remains activated until the movement sequence of the support frame (withdrawal, advancing, setting) is completely finished and is then switched off by the associated control unit. In accordance with the present invention, therefore, the sensors arranged on the support frame are de-activated most of the time and are only switched on when the support frame is to be moved. By this selective control of the individual sensors the current requirement is small and the strain on the miners due to electro-smog is negligibly small or largely absent.

Preferably the sampling of the working and operating area of the support frame is effected according to an active/passive strobing process, in which the persons at the face are equipped with a transponder device, which is activated by an activated detection sensor if a person enters the sampled detection area of the detection sensor or is present in the area, and which then transmits a signal of the person's presence to the detection sensor, in consequence of which the detection sensor transmits a stop signal to the associated control unit. Since in this embodiment of the invention the transponder device, worn for instance by a miner on his helmet or belt, is only activated when the miner is in the working and operating area of a support frame which is shortly to be moved, and correspondingly only transmits a signal of his presence at all in this comparatively infrequent situation, the current requirement of the transponder device is small, since it is for most of the time in "stand-by" mode which has a low energy requirement. It is therefore sufficient for the current supply to the transponder to be provided by a comparatively small, and thereby light, battery or an accumulator.

In a preferred embodiment the detection sensors sample their individual detection areas cyclically with a cycle time between 2 and 200 milli-seconds. Advantageously the cycle time lies in the range of 10 to 100 milliseconds. This means that a person who comes within the detection area of a sensor and into the working and operating area of the corresponding support frame is detected within a very short cycle time, in any case less than 0.2 seconds, and the presence of the person is indicated by the output of the stop signal to the control unit so that even a support frame already in movement can be brought to a standstill in a fraction of a second, so as not to endanger the person in the danger area.

Preferably the signals generated by the detection sensors are direct current signals with variable voltage amplitude. Advantageously the signals generated by the detection sensors have binary values and the information to be transmitted is coded by serial protocols. Therefore, the direct current signals with variable amplitude can be detected and evaluated by the control unit and, using suitable logging devices a logging not only of the stop and release signals emitted from the detection sensors, but also of inputted operating conditions or similar is possible.

Preferably the detection area of each detection sensor includes the working and operating area of the associated support frame and at least a part of the working and operating areas of the adjacent support frames. A detection sensor can thereby not only establish whether a person is present within the working and operating area of the associated support frame which is to be moved or is already moving, but can also detect whether a person comes into the working and operating area of the support frames adjacent to the moving or soon-to-be-moved support frame and possibly will shortly reach the working and operating area of this frame, so that its movement can be prevented or stopped before the person enters the actual danger zone.

Advantageously, the detection sensors cyclically perform a self test. Preferably the self test of a detection sensor is only performed if following its activation and sampling of the detection area, no person is detected. By the self test of the sensors fault conditions are very quickly recognised and can be reported to the control unit of the support frame.

Another aspect of the present invention is directed to a device as described in the opening paragraph of the present specification in which the detection sensors can be activated and de-activated by the control units of the associated support frames.

Advantageously, the detection sensors can be adjusted for different sizes of working and operating areas of the support frames. This means that fault messages from a sensor can be avoided, which otherwise could arise from non-alignment of the sensor to the height, width and depth of the support frame in its operating condition.

Preferably the detection sensors monitor the detection area cyclically with a cycle time of not more than 0.2 s.

Advantageously the detection sensors are housed in protective housings, where they are protected from the rough conditions in underground mining.

Preferably the device is further provided with listing arrangements for capturing and listing the adjustment of the detection sensors.

Advantageously the detection sensors are connected via control signal lines to the control units.

Preferably, the detection sensors operate in the intrinsically safe power range. This is well known in underground mining and is frequently required and reduces danger from fire-damp.

Preferably, the detection sensors are mounted on the roof caps of the support frames. Alternatively, they are positioned on the props of the support frames.

In a preferred embodiment indicating devices are provided for the detection sensors.

Preferably the indicating devices comprise light emitting diodes or similar.

Advantageously, the detection sensors each comprise a transmitter unit and a receiver unit, in which the transmitter unit transmits a signal for the activation of a transponder device carried by a person within the detection area, and the receiver unit receives a signal transmitted from the activated transponder device. The latter signal is sent on to a monitoring unit, which evaluates it and passes it as a control signal for the interruption of the support frame movement to the control unit of the support frame concerned.

Preferably the transmitter unit has a magnetic field antenna arrangement with two ferrite coil antennae arranged substantially in parallel and connected in equal phase. Advantageously the two ferrite coil antennae are each connected in series with a capacitor. Preferably, the ferrite coil antenna are arranged alongside each other on and substantially parallel to the roof cap of the individual support frame. This configuration generates a common, mutually assisting and magnetically amplified field with a substantially elliptical propagation in the plane. The greater half-axis of the ellipse runs between the two antennae, parallel to them, and the smaller half-axis runs at right angles to the direction of the antenna length. The shape of the field can thereby be matched to the ground plan shape of the individual support frame, so that it is possible, using one transmitter unit in each case, to monitor the support frame completely, which is longer than it is broad, without however detecting the immediately adjacent support frame. Advantageously, the longitudinal direction of the ferrite coil antennae runs substantially at right angles to the longitudinal direction of the face. For optimum matching of the two antennae to the dimensions of the individual support frame, it is expedient if the antennae are attached to the support frame with an adjustable separation between them.

Preferably the receiver unit has three receiver coils arranged at angles to each other. It is thereby possible to receive a solely one-dimensional signal of a person's presence generated by a transponder device reliably and independently of the direction in which the signal of the person's presence is in fact radiated from the transponder device. Advantageously, the three receiver coils of the receiver unit are arranged at right angles to each other.

In a preferred embodiment, the transponder device has a receiver device and a transmitter element, which on receipt, by the, receiver device, of the signal transmitted by the transmitter unit, is activated by it. Advantageously, the receiver device has three individual receivers arranged at angles to each other. Preferably, the individual receivers are arranged at right angles to each other.

Advantageously, the ferrite coil antenna of the transmitter unit are operated at a frequency between 7 and 11 kHz. Preferably the frequency is 9 kHz.

Advantageously, the ferrite coil antennae are arranged on the support frame at a distance from each other of between 100 and 180 mm. Preferably the distance is between 120 and 150 mm. This gives the desired elliptical field shape for outer dimensions of a support frame of some 4 times 1.5–2 m.

In a preferred embodiment, the signal of a person's presence generated by the activated transmitter element of the transponder device is transmitted at a frequency between 1.5 and 2.5 MHz. In trials a frequency of 2 MHz has proved especially practicable, which is certainly high enough to exclude interference with other electronic components below the surface, and on the other hand is still low enough to generate the desired magnetic field.

An example of the method and an example of a device according to the present invention will now be described with reference to the accompanying Figures in which:

FIG. 4 shows a plan view of the antenna arrangement of a transmitter unit of the detection sensor shown in FIG. 3, and the field generated thereby; and FIG. 5 shows a block circuit diagram of a transponder device made in accordance with the invention.

For a more complete understanding of the invention, the reader is referred to DE-OS 36 27 174 and the corresponding British publication GB 85/21 813.

Figure 1:
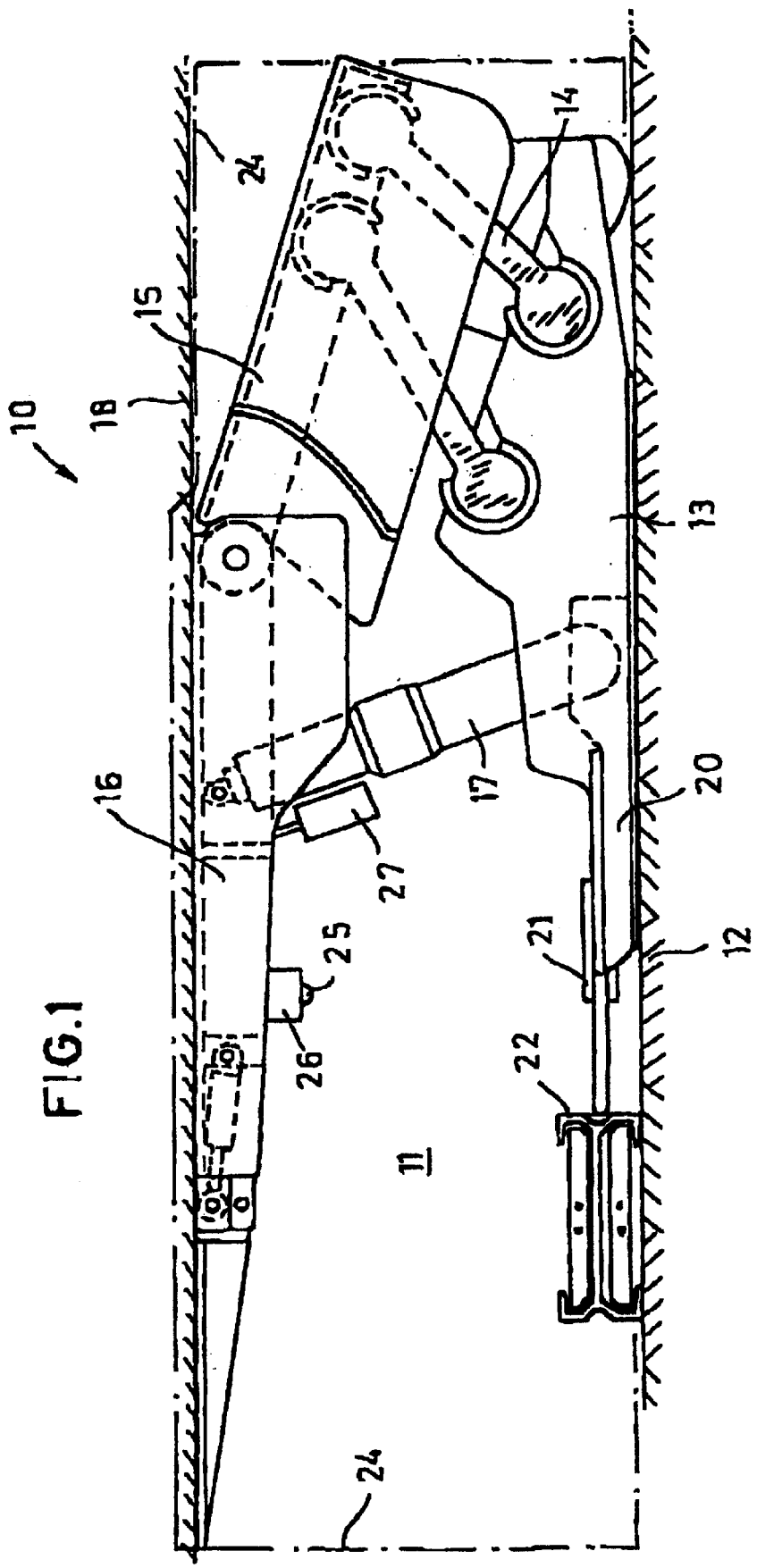
FIG. 1 shows a side elevation of a support frames arranged at a face with a device according to the invention for the performance of the method according to the invention.
Figure 2:
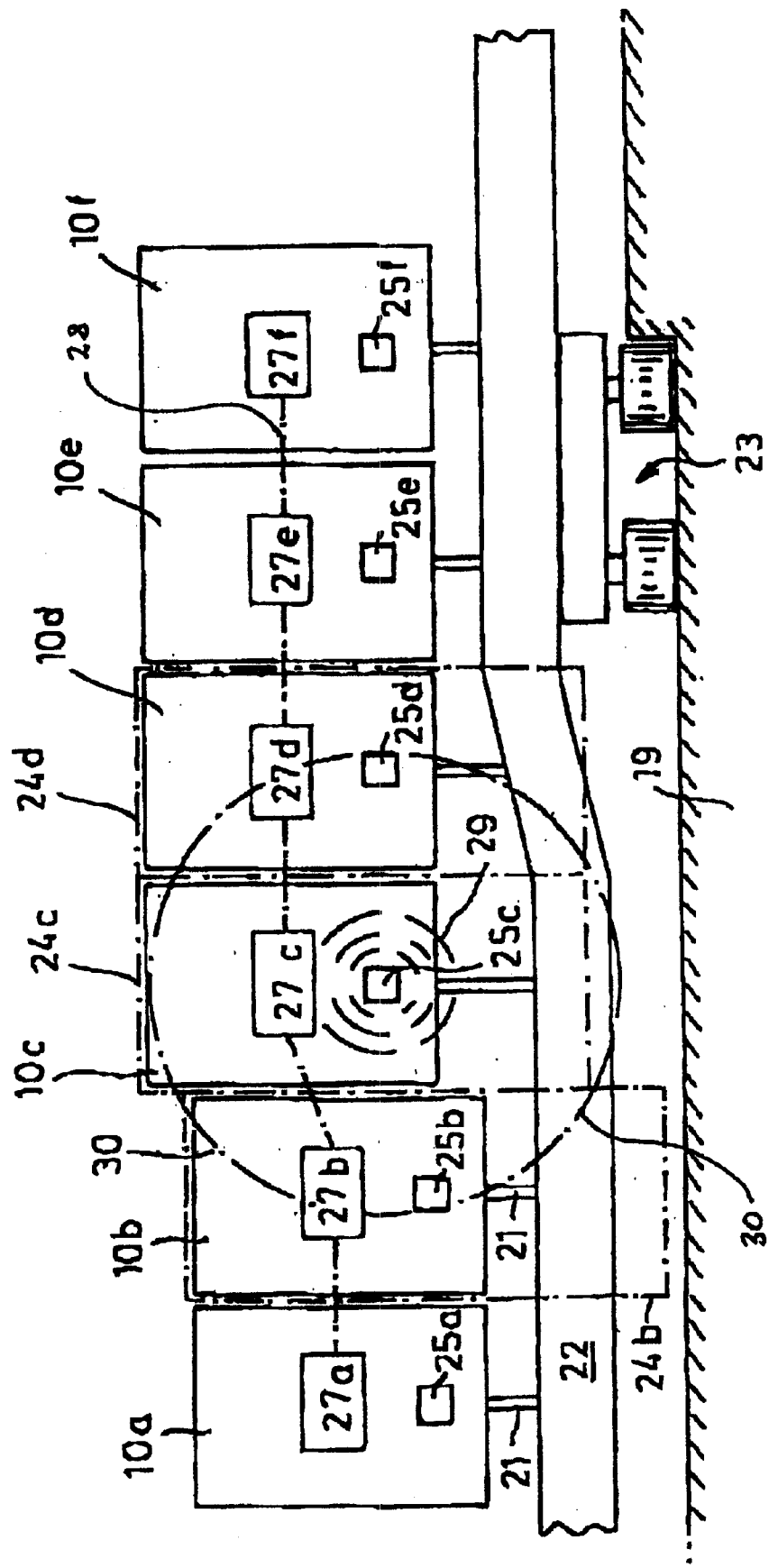
FIG. 2 shows a strongly schematic plan view of a part of the face with several of the support frames shown in FIG. 1.

FIG. 1 shows a support frame 10, for use in advancing underground face extraction, a current technique in modern underground mining for the extraction of coal and other minerals. For the support of the face 11, several support frames 10 are arranged alongside each other at the face 11, as is indicated in FIG. 2.

The support frames comprise a ground frame 13 resting on the ground 12, a gob shield 15 connected with this via a lemniscape drive 14, and a roof cap 16, connected in a jointed manner with the latter, which is supported via two supporting cylinders 17 on the ground frame 13, and underpins the roof 18. In the forward portion 20 of the ground frame 13 facing the working face 19, this is coupled via an advancing cylinder 21, to a face conveyor 22, along which an extraction machine 23 can move, which is depicted in FIG. 2 as a drum cutter-loader and which, in traversing the face 11, wins the coal from the working face 19, which is transported away by the face conveyor 22. After the transit of the extraction machine 23 past a support frame 10, the face conveyor 22, which comprises individual conveyor pans, jointed in formation along its length, is pushed forward in the direction of the working face 19 by the movement cylinders 21 of the support frame 10, as is indicated in FIG. 2 in the support frame referenced 10d. Then, one support frame 10 after another withdraws from the roof 18 by retraction of the support cylinder 17, thereby lowering the roof cap 16 from the roof 18, pushes forward in the direction of the working face 19 (advancing) by retraction of the movement cylinder 21, and finally by extension of the support cylinder 17 is set in the new position. The operating method of such an advancing support is well known and therefore needs no further detailed explanation here.

In order to avoid personal injury accidents, which could occur if persons remain in the working and operating area 24 bounded by the roof cap 16, the floor frame 13 and the rear gob shield 15 whilst the support frame 10 performs its movements for withdrawal, advancing or setting, the support frame 10 is provided with a device for detecting the presence of persons, which is a subject of the present invention. All the support frames 10 have detection sensors 25, which are arranged in protective housings 26 on the underside of the roof caps 16. The detection sensors 25 are connected via control lines 31 to individual control units 27. The control units 27 of the individual support frames 10 are connected to each other by control cables 28.

The detection sensors 25a to 25f, assigned to the individual support frames 10a to 10f comprise a transmitter and receiver unit, which can be activated and de-activated by the associated individual control units 27. The method of operation is such that the detection sensors 25 of the various support frames 10 arranged alongside each other at the face 11 are not permanently activated, but only the sensors of those support frames which are actually performing their movements (withdrawal, advancing, setting), or are about to perform them shortly are activated.

Amongst the support frames 10a to 10f shown in FIG. 2 the two frames shown on the left, 10a and 10b are already set in their new positions, pushed forward in the direction of the working face 19. Their detection sensors 25a and 25b are not activated, so that they do not respond to the presence of a person in the working area 24 of these frames 10a, 10b. In the adjacent support frame 10c, which is to be the next frame to be advanced in the direction of the working face 19 and newly set there, the detection sensor 25c has been activated by the associated control unit 27c, as indicated by the signal waves 29 forming rays radiating from the sensor 25c. The detection area 30 of the sensor 25c covers not only the working and operating area 24c of the support frame 10c, but also includes part of the working and operating areas 24b and 24d of the adjacent support frames 10b and 10d.

The detection sensor 25c is activated by the associated control unit 27c some three to five seconds before the point in time at which the movement of the support frame 10c is to begin by the retraction of the roof cap 16. The detection sensor 25c thus begins, three to five seconds before the intended withdrawal process, to sample the detection area 30, so as to establish whether a person is within the working and operating area 24c of the support frame 10c to be moved, or in the overlapping areas of the adjacent support frames 10b and 10d, who could be endangered by the movement of the support frame 10c. If the detection sensor 25c establishes the presence of a person in the danger area, it transmits a stop signal to the individual control unit 27c, which prevents any movement of the support frame 10c, or immediately stops it, for as long as the person remains in the detection area 30 of the detection sensor 25c.

The detection sensor 25c remains active until the complete sequence of movements during withdrawal, advancing and renewed setting of the support frame 10c has ended. During this time the detection sensor 25c samples the working and operating area 24c of the support frame 10c and part of those of the adjacent support frames 10b and 10d cyclically with a short cycle time of some 20 milliseconds, and transmits after the completion of each cycle a new signal to the control unit 27c, which is either a release signal, if no person has been detected in the danger area, or one which acts as a stop signal for immediate interruption of the movement process, if a person enters the detection area 30 of the detection sensor 25c during the withdrawal, advancing or setting.

As soon as the support frame 10c has reached its new, advanced position and like the previously moved support frames 10a and 10b has been set in the new position, the detection sensor 25c of this support frame 10c is de-activated, and thus no longer samples the working and operating area 24c of the newly set support frame 10c.

Figure 3:
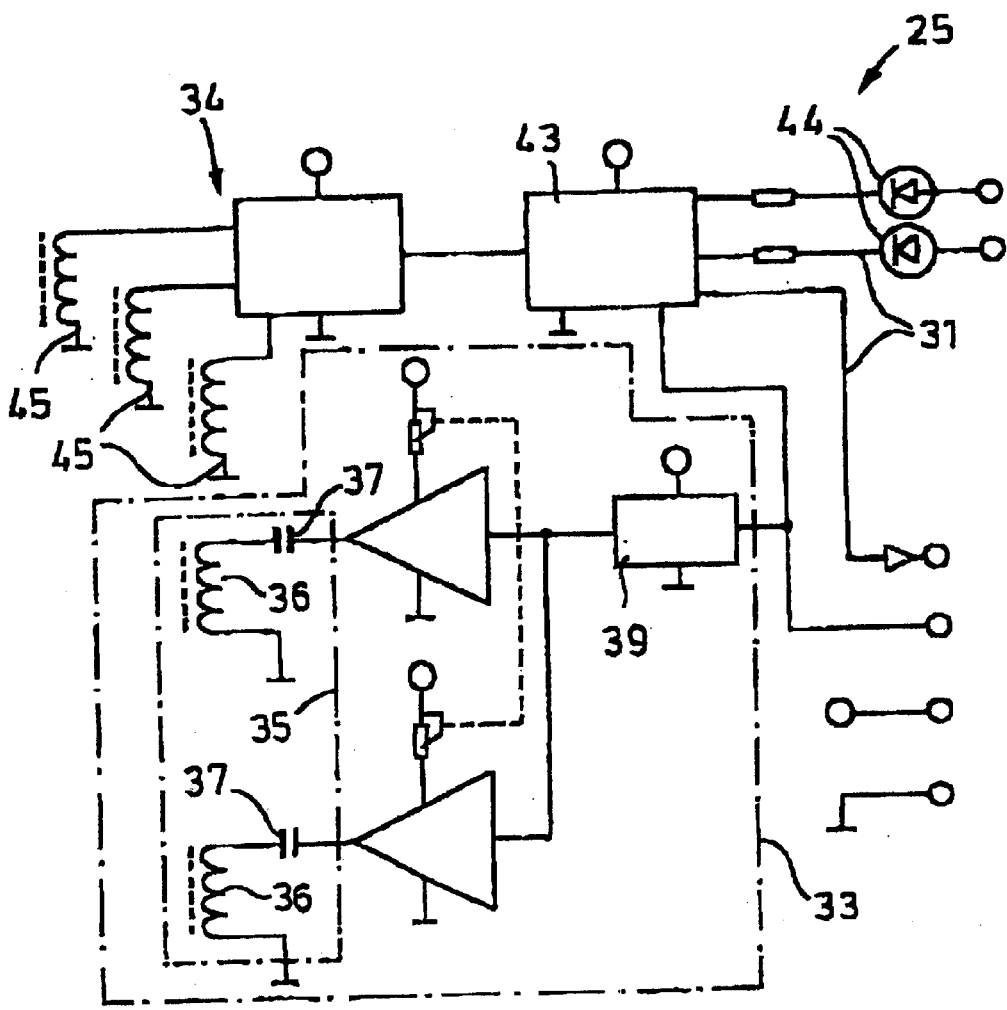
FIG. 3 shows a block circuit diagram of a detection sensor made in accordance with the invention.

FIG. 3 shows a detection sensor 25 comprising a transmitter unit 33 and a receiver unit 34. The transmitter unit 33 begins to transmit a signal some three to five seconds before the advance of the support frame 10 concerned, which can be received by a transponder device (32 in FIG. 5) carried by a person who is in the detection area 30. The signal transmitted by the transmitter unit 33 then activates the transponder device 32, which immediately sends out a signal which is received by the receiver unit 34 of the detection sensor 25.

As can be seen from FIGS. 3 and 4, the transmitter unit 33 has a magnetic field antenna arrangement 35 with two ferrite coil antennae 36 arranged in parallel and connected in equal phase, each of which is connected in series with a capacitor 37. The ferrite coil antennae 36 arranged alongside each other are mounted on the roof cap 16 of the associated support frame 10 substantially horizontally, and thus substantially parallel to the cap such that their long axes point in the direction of the working face 19. As FIG. 4 shows, the two ferrite coil antennae 36 are arranged at a distance of some 120 to 150 mm from each other, and generate a common mutually additive and magnetically amplifying field 38 which has a substantially elliptical shape in section, the greater half axis running in the longitudinal direction of the coils 36. The strengthening of the field 38 resulting from the overlapping of the lines of force is attained essentially with the same current requirement which a single antenna would have, which has a substantially circular sampling and detection area as is indicated in FIG. 2 by the reference numeral 30. The preferred elliptical shape of the field 38 offers the advantage that the shape of the field, with greater length than breadth, is matched to the shape of the ground plan of the individual support frame 10, which similarly is longer in the advancing direction than in its width, which runs in the longitudinal direction of the face 11. The whole working and operating area 24 of the support frame 10 concerned, with only a small overlapping of the corresponding area of an immediately adjacent support frame, can therefore be sampled with only one detection sensor 25, which offers the advantage that during advancing of a support frame a person can remain in the working and operating area of the immediately adjacent support frame, so as for instance to control the adjacent support frame manually with the aid of the adjacent control unit or to monitor the automatic withdrawal, advance and setting process by eye.

The field 38 generated by the two ferrite coil antennae 36 is a one-dimensional "calling" field, whose frequency is determined by a frequency generator 39 and in a preferred embodiment is 9 kHz. In order to ensure that the transponder device 32 is activated by the one-dimensional "calling" field 38, whenever it comes within the detection area 30 of the detection sensor 25, and indeed independently of its alignment in the field 38, it is equipped with a receiver device 40 having three individual receivers 41. These are arranged at right angles to each other in the transponder device 32 carried by a person, and thereby permit optimum reception in all directions. The field 38 generated by the transmitter unit 33 of the detection sensor 25 is received by the receiver device 40 of the transponder 32 in the detection area 30, in which the field signal is strong enough, and then activates the transmitter element 42 of the transponder device 32, which generates a one dimensional "answer" field with a frequency of preferably about 2 MHz. The presence of the "answer" field is detected by the receiver unit 34 of the detection sensor 25, which then emits a warning signal to a logic circuit 43, which, via control lines 31, sets off an optical alarm of warning lights (LEDs) 44 and immediately halts the movement of the corresponding support frame 10. Since the "answer" field generated by the transmitter element 42 is similarly a one dimensional field, the receiver unit 34 of the detection sensor 25 also has three receiver coils 45, which are arranged substantially at right angles to each other in the detection sensor 25 and thus can detect the "answer" field reliably, independently of the spatial orientation of the transponder device 32 in the region of the support frame 10.

In accordance with the method according to the present invention, monitoring of the face to avoid endangering persons from advancing support frames only occurs in the region in which the danger to a miner can actually arise. Contrary to the state of the art, only a small section of the face is sampled by the electromagnetic waves of selected detection sensors, so that the miners occupied at the face are not exposed to a permanent electro-smog. The transponder devices carried by the miners in the use of the active/passive strobing technique, which are activated by an activated detection sensor and transmit an "answer" signal to the receiver unit of the detection sensor, are only switched out of their stand-by mode into the transmit mode when the person carrying the transponder comes into the danger zone of a support frame actually in motion or shortly to be set in motion, which is being sampled by the sensor.

In order to improve the safety of the method still further, the detection sensors can perform a self test at the end of a sampling cycle, to determine whether the sensor is still working correctly. The self test of the detection sensor occurs if, after activation of the detection sensor and sampling of the detection area no person was detected there. If, on the other hand, during the sampling of the detection area a person is detected in the working and operating area of the support frame or in the overlap region to the adjacent support frames, the performance of a self test is not necessary and the recognition sensor transmits its stop signal immediately to the control unit without comparison with the result of a self-test.

The results of the cyclically repeated sampling from an activated detection sensor transmitted to the associated control unit can be stored in a suitable storage device (not shown) and listed, and can be called up later by the operator of the installation, and analysed. Therefore, in the event of a functional failure of the monitoring device, it is possible subsequently to establish what led to the failure and initiated the functional failure.

The invention is not limited to the embodiments represented and described herein as many modifications are possible which do not depart from the scope of the present invention. Thus it is for instance possible to arrange several individual sensors on different positions on a support frame for the monitoring of the working and operating areas of a support frame, in order to monitor them optimally. In the performance of the method according to the invention it is possible to activate the detection sensors not only of one support frame, but possibly also the sensors of the two adjacent support frames, in order to increase the size of the area in which persons should not be during the movement of a support frame. It is essential for the invention that not all the sensors of all the support frames at a face are activated simultaneously, but only the sensors in those areas, in which danger to persons owing to the movement of support frames can actually occur.

We claim:

1. A method for detecting the presence of persons in underground mining faces supported by support frames, in which detection sensors are provided on at least some of the support frames, and which are coupled to control units for the support frames, whereby the detection sensors sample at least the working and operating area of a support frame to which they are assigned and bring that support frame to a standstill or do not permit its movement, if the presence of a person is established in a detection area, in which the detection sensors can be activated by the control units of the support frame and are activated before a planned movement of the support frame and de-activated after the completion of the movement.

2. A method according to claim 1, in which each support frame is provided with at least one detection sensor.

3. A method according to claim 1, in which the detection sensor of a support frame to be moved is activated at a time before the planned support frame movement and then the working and operating area of at least the support frame concerned is sampled, and a stop signal is transmitted to the control unit if the presence of a person is established during the sampling, or a release signal is transmitted if no person is established in the detection area during the sampling.

4. A method according to claim 1, in which the sampling of the working and operating area of the support frame is effected according to an active/passive strobing process, in which the persons at the face are equipped with a transponder device, which is activated by an activated detection sensor if a person enters the sampled detection area of the detection sensor or is present in the area, and which then transmits a signal of the person's presence to the detection sensor, in consequence of which the detection sensor transmits a stop signal to the associated control unit.

5. A method according to claim 1, in which the detection sensors sample their individual detection areas cyclically with a cycle time between 2 and 200 ms.

6. A method according to claim 5, in which the cycle time lies in the range of 10 to 100 ms.

7. A method according to claim 1, in which the signals generated by the detection sensors are direct current signals with variable voltage amplitude.

8. A method according to claim 1, in which the signals generated by the detection sensors have binary values and the information to be transmitted is coded by serial protocols.

9. A method according to claim 1, in which the detection area of each detection sensor includes the working and operating area of its associated support frame and at least a part of the working and operating areas of the adjacent support frames.

10. A method according to claim 1, in which the detection sensors cyclically perform a self-test.

11. A method according to claim, 10, in which the self-test of a detection sensor is only performed if following its activation and on sampling of the detection area, no person is detected.

12. A device for the detection of the presence of persons in underground mining faces supported by support frames, whereby detection sensors are provided on at least some of the support frames, and are coupled to control units for controlling the movement of the support frames and which sample at least the working and operating areas of the associated support frames, in which the detection sensors are activated by the control units of the associated support frames when the support frame is about to move and are de-activated when movement of the support frame has ceased.

13. A device according to claim 12, in which the detection sensors can be adjusted for different sizes of working and operating areas of the support frames.

14. A device according to claim 12, in which the detection sensors monitor the detection area cyclically with a cycle time of not more than 0.2 s.

15. A device according to claim 12, in which the detection sensors are housed in protective housings.

16. A device according to claim 12, and further provided with listing arrangements for capturing and listing the adjustment of the detection sensors.

17. A device according to claim 12, in which the detection sensors are connected via control signal lines to the control units.

18. A device according to claim 12, in which the detection sensors operate in the intrinsically safe power range.

19. A device according to claim 12, in which the detection sensors are mounted on the roof caps of the support frames.

20. A device according to claim 12, in which the indicating devices are provided for detection sensors.

21. A device according to claim 20, in which the indicating devices comprise light emitting diodes or similar.

22. A device according to claim 12, in which the detection sensors each comprise a transmitter unit and a receiver unit, in which the transmitter unit. transmits a signal for the activation of a transponder device carried by a person within the detection area, and the receiver unit receives a signal transmitted from the activated transponder device.

23. A device according to claim 22, in which the transmitter unit has a magnetic field antenna arrangement with two ferrite coil antennae arranged substantially in parallel and connected in equal phase.

24. A device according to claim 23, in which the two ferrite coil antennae are each connected in series with a capacitor.

25. A device according to claim 23, in which the ferrite coil antennae are arranged alongside each other on and substantially parallel to the roof cap of the individual support frame.

26. A device according to claim 23, in which the longitudinal direction of the ferrite coil antennae runs substantially at right angles to the longitudinal direction of the face.

27. A device according to claim 22, in which the receiver unit has three receiver coils arranged at angles to each other.

28. A device according to claim 27, in which the three receiver coils (45) of the receiver unit are arranged at right angles to each other.

29. A device according to claim 22, in which the transponder device has a receiver device and a transmitter element, which on receipt by the receiver device of the signal transmitted by the transmitter unit is activated by it.

30. A device according to claim 29, in which the receiver device has three individual receivers arranged at angles to each other.

31. A device according to claim 30, in which the individual receivers are arranged at right angles to each other.

32. A device according to claim 23, in which the ferrite coil antennae of the transmitter unit are operated at a frequency between 7 and 11 kHz.

33. A device according to claim 32, in which the frequency is 9 kHz.

34. A device according to claim 23, in which the ferrite coil antennae are arranged on the support frame at a distance from each other of between 100 and 180 mm.

35. A device according to claim 34, in which the distance amounts to between 120 and 150 mm.

36. A device according to claim 29, in which the signal of a person's presence generated by the activated transmitter element of the transponder device is transmitted at a frequency between 1.5 and 2.5 MHz.

* * * * *